(No Model.)
W. H. SMITH.
FEED WATER PURIFIER AND HEATER.
No. 398,856. Patented Mar. 5, 1889.
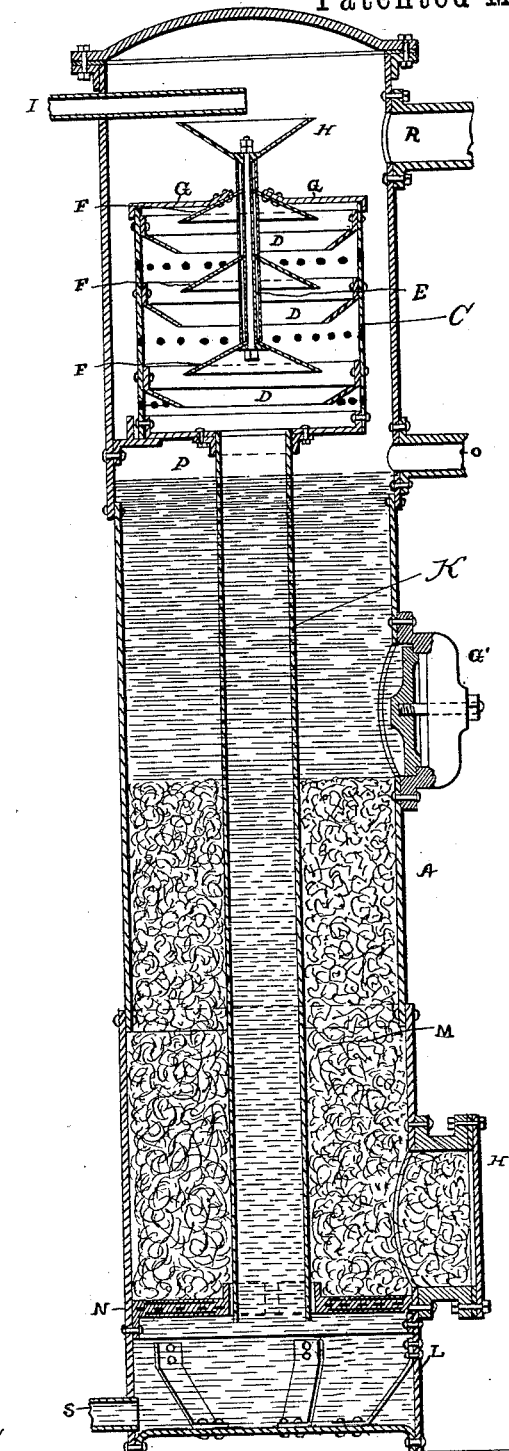
WITNESSES.
Alex Mahon
Chas. Helm.
INVENTOR.
W. H. Smith
By
D. W. Ginsabaugh
Attorney.

UNITED STATES PATENT OFFICE.

WILLIAM H. SMITH, OF CHICAGO, ILLINOIS.

FEED-WATER PURIFIER AND HEATER.

SPECIFICATION forming part of Letters Patent No. 398,856, dated March 5, 1889.

Application filed May 21, 1888. Serial No. 274,543. (No model.)

*To all whom it may concern:*

Be it known that I, WILLIAM H. SMITH, a citizen of the United States of America, residing at Chicago, in the county of Cook and State of Illinois, have invented certain new and useful Improvements in Feed-Water Purifier and Heater, of which the following is a specification, reference being had therein to the accompanying drawing.

My invention relates to improvements in feed-water purifiers and heaters for steam-boilers and other purposes.

The object of my invention is to provide a device whereby the feed-water for steam-boilers is heated and thoroughly purified or freed from carbonate of lime, sulphate of lime, carbonate of magnesia, oxide of iron, alumina, silica, and other impurities which form a scale or coating on the inside of steam-boilers.

The drawing forming a part of this application shows a vertical sectional view of my improved feed-water purifier and heater.

A indicates the main body or shell of the device, which may be a cylindrical or other shaped vessel in cross-section and made of heavy sheet metal or boiler-iron, said vessel being provided with a permanent or rigid bottom and with a top or cover secured in any suitable manner, so that it can be removed when it is desired to repair or clean out the interior of the cylinder.

G' and H' are man-holes or openings through which the charcoal, M, or other filtering material is charged into or discharged from the cylinder.

C is a perforated cylinder mounted on suitable lugs or brackets in the upper portion of the main body A, and to the inner surface of said perforated cylinder is secured a series of annular funnel-shaped plates, D.

E is a tube or bar provided with a series of sheet-metal cones, F, said tube and cones being supported centrally in the perforated cylinder C by means of the bars or rods G.

H is a sheet-metal pan in the form of an inverted cone secured to the upper end of the tube or rod E, which pan receives the water from the supply-pipe I.

The pipe K leads from the bottom of the perforated cylinder C down to the top of the sediment-chamber L, located in the bottom of the cylinder A, said chamber L being separated from the upper portion of the cylinder by the perforated diaphragm N, on which the charcoal or other filtering material, M, is supported.

The water to be heated and purified is admitted to the pan H through the pipe I, from whence it overflows in thin sheets onto the upper cone F, and is deflected onto the upper plate D, which in turn deflects it onto the second cone F, and from thence it passes onto the second plate D, and so on throughout the series of cones and plates.

O is a pipe leading from chamber P above the filtering material to the boiler, through which the purified water is supplied to the boiler.

R is a pipe leading from the steam-space of the boiler to the top of the purifier, and through which steam is admitted to heat the water as it flows over the pan H and down over the surface of the cones F and plates D, said steam being admitted through perforations to the interior of the cylinder C.

S is a pipe leading from the sediment-chamber L, and through which said chamber is cleaned of any animal, mineral, or vegetable substances which may have accumulated there.

As before intimated, the water is heated by the live steam, which enters through the pipe R and is in the best possible condition to deposit the minerals held in solution into the sediment-chamber L. The water then rises through the filtering material, where all sediment or mineral matter is removed, and when it reaches that portion of the cylinder marked P above the filtering material it is in condition to flow into the boiler.

It will be noticed that the direction of the water when it is being filtered is upward through the filtering material, so that the lower portion of the filtering material receives the greatest deposits of the sediment, and that when it is desired to cleanse the charcoal, coke, or other filtering medium it can be readily done by forcing water through the pipe O or steam through the pipe R through the charcoal, forcing the sediment down into the chamber L and out through the pipe S, and in this way I am enabled to revivify or wash the filtering material with but very little trouble.

Having thus described my invention, what I claim, and desire to secure by Letters Patent, is—

1. In a feed-water purifier, the combination, with the outer cylinder having an inlet-pipe for admission of water, of an interior cylinder located below the inlet-pipe and provided interiorly with central and circumferential deflectors alternately arranged, whereby the water in its passage is thrown back and forth from and toward the center, substantially as and for the purpose described.

2. In a feed-water purifier and heater, the combination, with the outer shell provided at its upper part with steam and water inlet pipes, of an interior perforated cylinder, C, supported within the shell, with an annular space between the two, said cylinder C having interior deflectors for spreading and spraying the water in its passage, substantially as described.

3. In a feed-water purifier and heater, the combination, with the outer shell or case having at its upper part steam and water inlet pipes and in its lower part a perforated diaphragm, N, and above the latter filtering material and an outlet, of an interior perforated cylinder, C, supported within the shell or case, with an annular space between the two, said cylinder C having interior deflectors and communicating through a pipe, K, with the chamber below the diaphragm N, substantially as described.

In testimony whereof I affix my signature in presence of two witnesses.

WILLIAM H. SMITH.

Witnesses:
    WILLIAM H. JOPLIN,
    ALBERT E. ANDERSON.